United States Patent
Silverman

(10) Patent No.: US 6,364,417 B1
(45) Date of Patent: Apr. 2, 2002

(54) SAFETY HARNESS

(76) Inventor: Rick Owen Silverman, 9563 Benchmark La., Cincinnati, OH (US) 45242

( * ) Notice: Subject to any disclaimer, the term of this patent is extended or adjusted under 35 U.S.C. 154(b) by 0 days.

(21) Appl. No.: 09/515,259

(22) Filed: Feb. 29, 2000

(51) Int. Cl.[7] .................. A47D 15/00; B60R 22/10; B60R 22/12
(52) U.S. Cl. .............. 297/464; 297/465; 297/467; 297/484; 297/485
(58) Field of Search ................ 297/464, 465, 297/467, 468, 484, 485

(56) References Cited

U.S. PATENT DOCUMENTS

| | | | | |
|---|---|---|---|---|
| 1,048,033 A | * | 12/1912 | Brown | 297/484 X |
| 1,310,958 A | * | 7/1919 | O'Connor | 297/484 |
| 2,132,556 A | * | 10/1938 | Blackshaw | 297/484 |
| 2,979,028 A | * | 4/1961 | Zakely | 297/467 X |
| 3,275,373 A | * | 9/1966 | Card | 297/467 |
| 3,301,594 A | * | 1/1967 | Pukish, Jr. | 297/467 |
| 3,321,247 A | * | 5/1967 | Dillender | 297/465 |
| 3,380,776 A | * | 4/1968 | Dillender | 297/467 X |
| 4,026,245 A | * | 5/1977 | Arthur | 297/465 |
| 4,709,966 A | * | 12/1987 | Parkinson et al. | 297/484 X |
| 4,927,211 A | | 5/1990 | Bolcerek | 297/465 |
| 5,063,879 A | | 11/1991 | Vorbau | 119/96 |
| 5,074,588 A | | 12/1991 | Huspen | 297/465 X |
| 5,080,191 A | * | 1/1992 | Sanchez | 297/465 X |
| 5,226,698 A | * | 7/1993 | Harrison | 297/464 X |
| 5,301,371 A | * | 4/1994 | Chao | 297/464 X |
| 5,540,403 A | | 7/1996 | Standley | 297/465 X |
| 5,544,363 A | * | 8/1996 | McCue et al. | 297/465 X |
| 5,628,548 A | | 5/1997 | Lacoste | 297/484 |
| 5,733,014 A | * | 3/1998 | Murray | 297/465 X |
| 6,009,839 A | * | 1/2000 | Kohn | 297/465 X |

FOREIGN PATENT DOCUMENTS

| | | | | |
|---|---|---|---|---|
| DE | 4401702 A | * | 8/1994 | 297/465 |

* cited by examiner

Primary Examiner—Jose V. Chen
Assistant Examiner—Rodney B. White
(74) Attorney, Agent, or Firm—Wood, Herron & Evnas, LLP

(57) ABSTRACT

A safety harness having a chest strap received over a user's shoulders, a crotch strap received between a user's legs and selectively attachable to the chest strap, and a back panel received against a user's back, the back panel being interposed between the crotch strap and chest strap. The back panel is substantially the width of the user's shoulders and the height of the user's torso to evenly disperse and dissipate forces from sudden movements acted upon a user when the harness is secured to a vehicular seatbelt.

8 Claims, 3 Drawing Sheets

SAFETY HARNESS

FIELD OF THE INVENTION

This invention relates to safety devices. More specifically, this invention relates to a child safety harness that attaches to an existing vehicle safety belt.

BACKGROUND OF THE INVENTION

The use of infant safety seats and harnesses for young children riding in automobiles and airplanes is known in the art. Seats usually consist of a hollow seat shell, are often padded, and are designed to be placed on the vehicle seat and secured to the vehicle's existing lap and/or shoulder belt system. In addition, such seats usually include some sort of integral belt restraint system to prevent the infant from escaping from the seat, or from being thrown from the seat upon rapid deceleration or impact of the vehicle. Infant car seats of this type are adequate for smaller children; but older and larger children often find such a seat too confining and uncomfortable. For larger and/or older children, larger types of car seats are available which include a metallic tubular frame adapted to be secured to the vehicle seat by the vehicle lap and/or shoulder belt system in similar fashion to the infant car seat described above. A larger padded seat having a shell-type enclosure or housing and a child safety belt restraint is mounted to the frame. Often, active and/or bored children find such seats too restrictive and resent the idea of being forced to use a "child's seat", resulting in disruptive behavior as a consequence while remaining too small or lightweight to properly fit into conventional, "adult size" shoulder and lap belt seat restraints.

Also, car seats, whether designed for infants or older children, are bulky and difficult to store when not in use. For convenience sake, such seats can be "permanently" mounted in the vehicle even when the children are not riding in the car.

In response to the drawbacks of conventional car seats, child restraining harnesses have been disclosed in the prior art. Such harnesses basically consist of a padded plate for attachment to the child's back with straps, and slots in the plate for accommodating the vehicular lap and/or shoulder belt system. One disadvantage of such harnesses is that a child may slide out from under the harness either deliberately or in certain emergency situations. Such a harness structure is also unsuitable for use in aircraft, since the child may easily fall out of the harness if the plane makes unusual maneuvers under emergency conditions.

Another disadvantage of the conventional restraining harnesses is the configuration of the plate, which bends under severe impact. Once bent, the plate may injure the child during post-impact rebound or whiplash. A further disadvantage of conventional restraining vests is that the shoulder belts pull unevenly upon loading from stress. This disadvantage may cause the plate to shift during impact, providing less than optimum protection to the child.

In the instance that a child is seated on the lap of an adult travel companion in a car or an airplane, the child may be left without a safety restraint. As a result, sudden turbulence, movement rapid positional change, or impact of the aircraft or car may thrust or inertially propel the child from its position on the lap of an adult through the cabin of the aircraft or towards the windshield of the car, possibly resulting in severe injury and/or death to the child. In the case of air travel, standard emergency landing and/or pre-crash procedures adopted by many airlines for the adult travel companion require the adult to firmly grasp and hold the child upon the adult's lap during crash or emergency landing. While such practice may prevent injury to the child during minor decelerations or turbulent conditions, it is believed that such procedure is wholly inadequate to safely restrain and hold the child during an actual crash, rapid positional change, or rapid deceleration.

OBJECTIVES OF THE INVENTION

It has therefore been an objective of the present invention to provide a safety harness that more evenly disperses stresses acted upon a user.

It has been a further objective of the present invention to provide a safety harness that is more comfortable to use while more evenly dispersing forces acted upon a user's spine.

SUMMARY OF THE INVENTION

The objectives of the present invention are achieved by providing in the preferred embodiment a safety harness with a back panel to evenly disperse stress acted upon a child and adapted to securely hold a child therein to an existing vehicular seatbelt. The safety harness has a chest strap and a crotch strap which converge approximately over a user's abdominal area and/or chest. The chest strap and crotch strap have a back panel interposed therebetween that is received across a user's back.

The back panel has a top and a bottom strap that are spaced apart from each other and lie transverse to a pair of spaced apart body straps that converge at their respective opposing ends to form the chest strap and the crotch strap. The top and bottom straps attached to the pair of body straps form a substantially open rectangular structure which lends lateral and vertical strength to the safety harness. A pair of diagonal straps each attached to a first end of one of the top and bottom straps and a second end of the other of the top and bottom straps intersect each other approximately medially so as to lend further vertical, lateral and diagonal structural strength to the safety harness. A pair of seatbelt straps are provided proximate the crotch strap through which a seatbelt is threaded so the safety harness is secured to the vehicle's existing seatbelt system.

In use, a person, e.g., a child, is placed within the safety harness so that the child's head is received through an aperture defined by the chest strap and back panel. Next, the crotch strap is raised up between the child's legs. A chest belt, having chest belt halves, provided on each of the chest strap and crotch strap, is secured and tightened across the child's chest. A waist belt secured to the bottom strap of the back panel is secured around the child's waist. The seatbelt is threaded through the seatbelt straps provided on the safety harness either before or after the child is secured therein.

DETAILED DESCRIPTION OF THE PREFERRED EMBODIMENT

Figure 1:
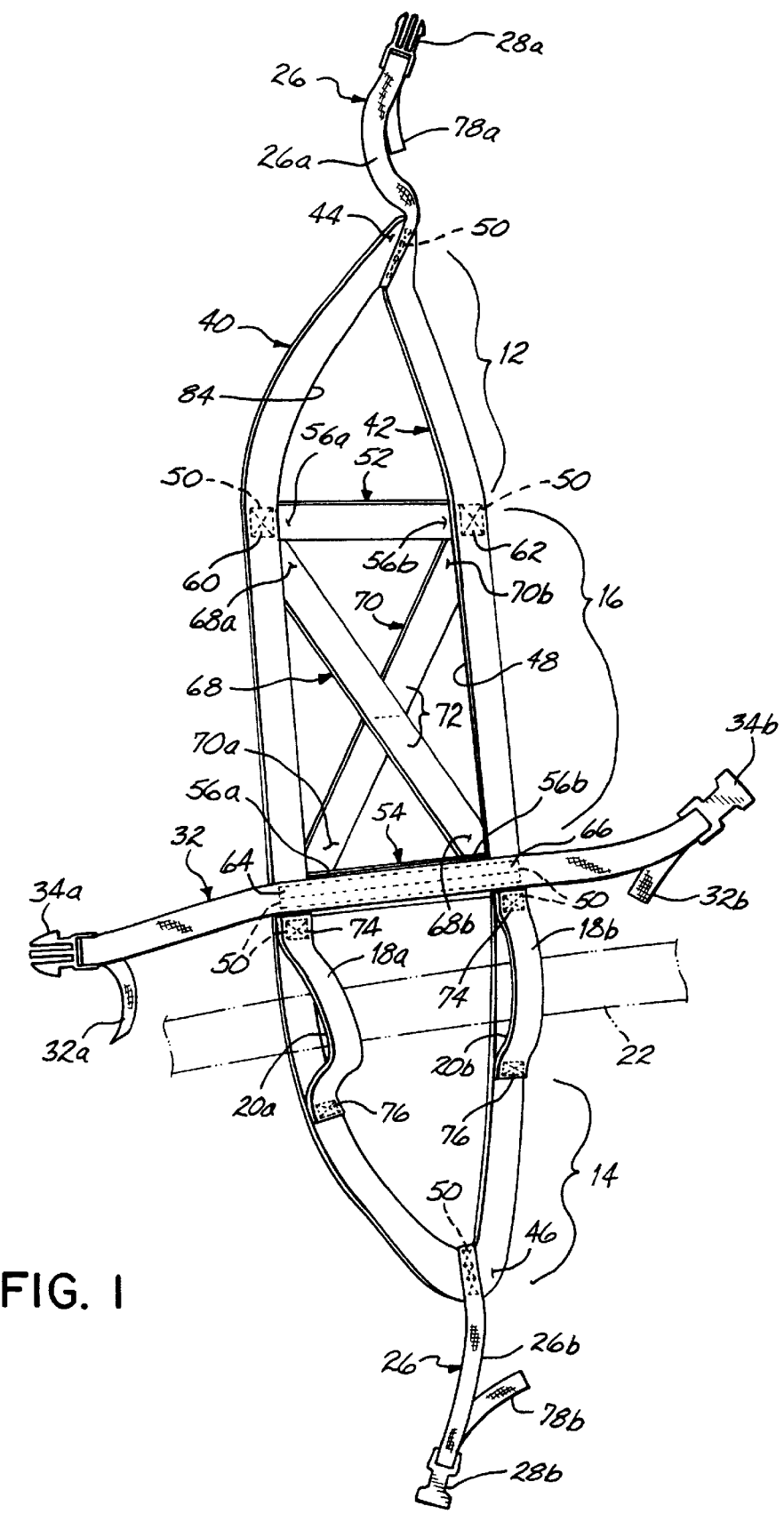
FIG. 1 is a perspective view of the present inventive safety harness.
Figure 2:
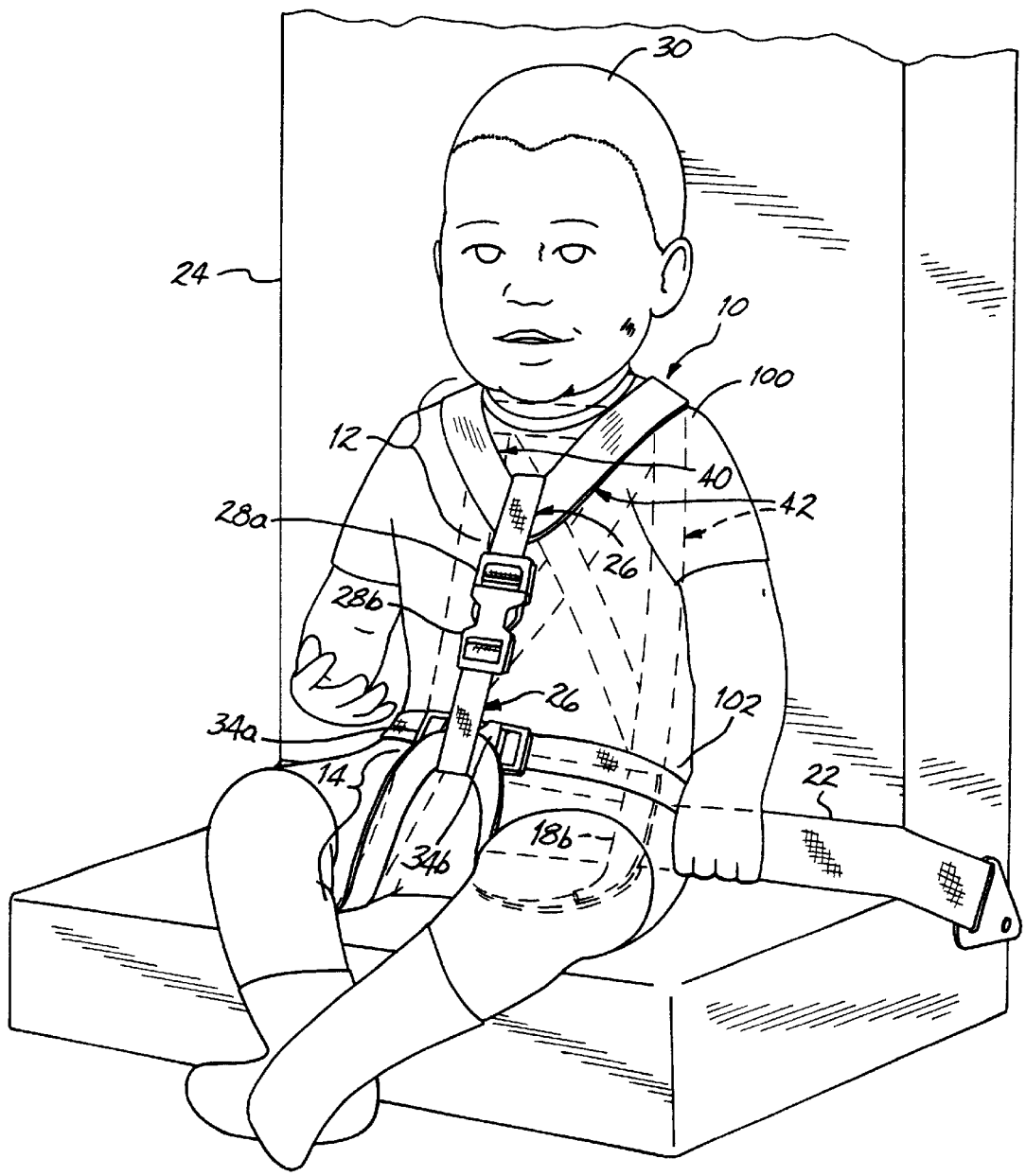
FIG. 2 is a perspective, environment of use view of the present inventive safety harness secured around a child and secured to a seatbelt.
Figure 3:
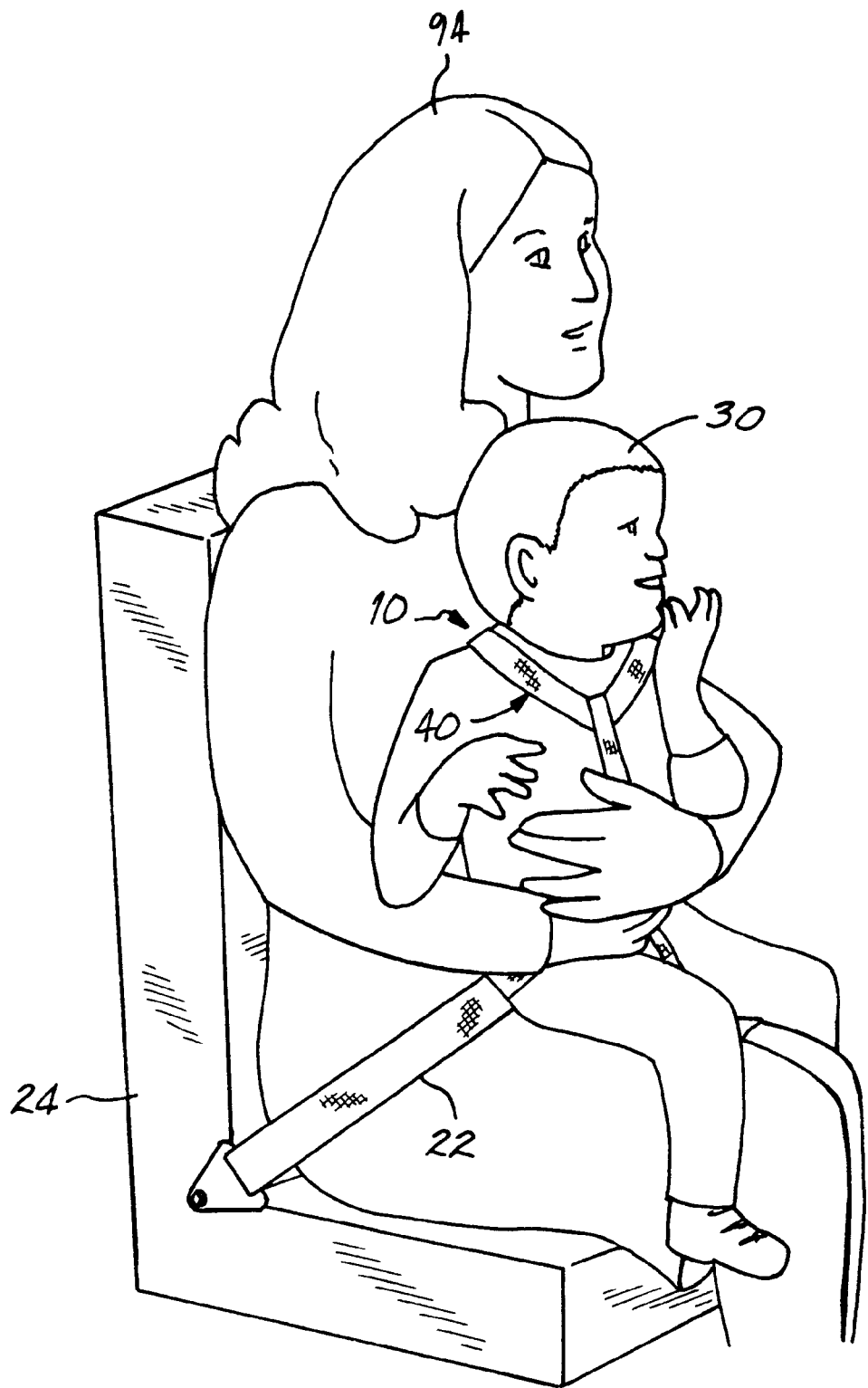
FIG. 3 is a perspective environment of use view of the present inventive safety harness secured to a seatbelt and around a child, while the child sits upon the lap of an adult.

As seen in FIGS. 1–3, the preferred embodiment of the present inventive safety harness 10 has a chest strap 12, a crotch strap 14 and a back panel 16 interposed between the chest and crotch straps 12, 14 which lends greater structural integrity to the safety harness 10. First and second seatbelt straps 18a, 18b are attached to the crotch strap 14 and define first and second apertures 20a, 20b, respectively, to receive a seatbelt 22 therethrough in order to secure the safety harness 10 to a seat 24 via the vehicle's existing restraint system.

The safety harness 10 has a chest belt 26 with first and second chest belt halves 26a, 26b, each of which provided with cooperating chest buckle halves 28a, 28b, respectively, to secure the first and second chest belt halves 26a, 26b to each other and drape across the abdominal area of a user, e.g., a child 30. The safety harness 10 has a waist belt 32 attached to the back panel 16 proximate the crotch strap 14. The waist belt 32 has opposing ends 32a, 32b provided with cooperating buckle halves 34a, 34b, respectively, to buckle around the user's waist.

The general embodiment of the presently preferred safety harness 10 having been described above, the safety harness 10, more specifically, has first and second body straps 40, 42 with respective first and second ends 44, 46. The first and second body straps 40, 42 are of substantially equal length and their respective first and second ends 44, 46 are attached to each other so as to form an envelope 48. In the preferred embodiment, the first and second ends 44, 46 of the first and second body straps 40, 42 are attached to each other securely by stitching 50, however, any other suitable means for attaching the first and second ends 44, 46 together is contemplated.

The back panel 16 is attached to the first and second body straps 40, 42 so that it is positioned substantially within the envelope 48. The back panel 16 has a top strap 52 and a bottom strap 54 having opposing ends 56a, 56b attached to the first and second body straps 40, 42. The top and bottom straps 52, 54 are substantially parallel to each other and substantially normal to the first and second body straps 40, 42 at the area of attachment thereto. The top and bottom straps 52, 54 are spaced from each other by a distance that approximates the height of a user's torso. As will be understood herein, the height of the user's torso is approximately the distance between the user's shoulders 100 and the user's hips 102 and may vary for users of different ages and body sizes. The top and bottom straps 52, 54 are attached to the first and second body straps 40, 42 with stitching 50, however, it will be understood that any other suitable means of attachment may be used. The top body strap 52 is attached at a first juncture 60 and a second juncture 62 to the first and second body straps 40, 42, respectively. The bottom strap 54 is attached at a third juncture 64 and a fourth juncture 66 to the first and second body straps 40, 42, respectively.

The back panel 16 has first and second diagonal straps 68, 70 with opposing ends 68a, 68b and 70a, 70b attached to the junctures 60, 66 and 64, 62, respectively. More particularly, the first diagonal strap 68 is attached to the first juncture 60 and fourth juncture 66. The second diagonal strap 70 is attached to the second juncture 62 and third juncture 64. The diagonal straps 68, 70 intersect each other approximately medially to form a fifth juncture 72. The diagonal straps 68, 70 are attached at each juncture 60, 62, 64, 66, 72 with stitching 50, however, any other suitable means of attachment may be used.

As mentioned above, the safety harness 10 has first and second seatbelt straps 18a, 18b. Each seatbelt strap 18a, 18b is attached to the safety harness 10 at a first end 74 proximate the third and fourth junctures 64, 66, respectively, and at a second end 76 approximately medially along the first and second body straps 40, 42 between the third and fourth junctures 64, 66 and the first and second body straps second ends 46. The first and second seatbelt straps 18a, 18b define the first and second apertures 20a, 20b, respectively, through which the seatbelt 22 is received in order to secure the safety harness 10 in position to the vehicular seat 24.

Also, as mentioned above, the chest belt 26 has first and second chest belt halves 26a, 26b. Each of the chest belt halves 26a, 26b has opposing first and second ends 78a, 78b. Each first end 78a is secured by stitching 50 to the first ends 44 and second ends 46 of the first and second body straps 40, 42, respectively. It will be understood that any other suitable means of attachment may be used. Each chest belt end 78b not attached to the body straps 40, 42 receives chest buckle halves 28a, 28b, cooperating with each other to buckle over a user's chest when in use.

In the preferred embodiment, the waist belt 32 is of singular construction secured to the first and second body straps 40, 42 at the third and fourth junctures 64, 66 and to the back panel bottom strap 54 by stitching 50 or any other suitable means of attachment.

As best seen in FIG. 3, in use, the safety harness 10 is fitted to a child 30 by locating the child's head through an aperture 84 defined by the chest strap 12 and the back panel top strap 52. The chest belt 26 having chest buckle half 26a is draped over the child's chest. The crotch strap 14 is lifted up between the child's legs and the buckle half 26b is secured to the buckle half 26a. Any slack in the chest belt 26 is taken out so that the chest strap 12 and crotch strap 14 are cinched securely around the child's torso. The waist belt buckle halves 34a, 34b are then secured to each other and any slack in the waist belt 32 is taken out so that the waist belt 32 is securely fitted around the child's waist.

The safety harness 10 receives the seatbelt 22 through the apertures 20a, 20b defined by the seatbelt straps 18a, 18b and the first and second body straps 40, 42. With the child 30 secured in the safety harness 10 and the safety harness 10 secured to the seat 24, the child 30 can sit in the seat 24 without an adult 94 providing additional security (FIG. 2). However, an adult 94 may also be secured in the vehicular seat 24 with the child 30 secured in the safety harness 10 and to the seatbelt 22, while sitting upon the adult's lap, as shown in FIG. 3.

In the event of emergency stops or other sudden movement in which the position of the child 30 may be rapidly changed, the force of restraint acted on the child 30 by the safety harness 10 is distributed evenly across the child's shoulders and back due to the configuration of the back panel 16. More specifically, the top and bottom straps 52, 54 of the back panel 16 evenly distribute and dissipate lateral forces across the child's shoulders and lower back. The first and second diagonal straps 68, 70 evenly distribute and dissipate torsional forces across the child's back. The first and second body straps 40, 42 help to evenly distribute and dissipate vertical forces acted upon the child across the child's shoulders and back and prevent the force of sudden stops from acting directly upon the child's spine. The configuration of the back panel 16 distributes forces over the child's entire back and shoulders that otherwise would act directly upon a child's spine.

In the preferred embodiment, the safety harness 10 is generally made of any suitable high tensile strength, non-stretchable woven belt material surrounded by relatively high density foam, such as thermoplastic foam, substantially enclosed by an attractive fabric cover with the belt encased in the foam providing the tensile strength for physical restraint of the occupant. In the preferred embodiment, the belt, foam and fabric cover are easily cleaned and disinfected and resist microorganism growth.

From the above disclosure of the detailed description of the present invention and the preceding summary of the preferred embodiment, those skilled in the art will comprehend the various modifications to which the present invention is susceptible. Therefore, I desire to be limited only by the scope of the following claims and equivalents thereof.

I claim:

1. A child safety harness for attachment to a vehicular seatbelt, comprising:
    a pair of body straps having first and second ends, said body straps being adapted to be placed against a child so that said body strap first ends are located over the child's shoulders and said second ends are located between the child's legs, said first and second ends being selectively secured to each other;
    a back panel attached to and located between said pair of body straps, said back panel having top and bottom straps with opposing ends attached to and forming junctions at their respective attachments with said pair of body straps, said top and bottom straps being spaced from and in substantially parallel alignment with each other, each of said top and bottom straps being substantially normal to said pair of body straps, said back panel also having a pair of diagonal straps each attached to a junction of one of said top and bottom straps and a junction of the other of said top and bottom straps, so that said diagonal straps intersect each other approximately medially; and
    at least one seatbelt strap attached to said body straps between said bottom strap and said body strap second ends, said seatbelt strap and said body strap defining an aperture for receiving a seatbelt.

2. The safety harness of claim 1, comprising:
    a chest belt attached to said body straps, said chest belt having a top half attached to at least one of said body strap first ends and a bottom half attached to at least one of said body strap second ends.

3. The safety harness of claim 2, comprising:
    a chest buckle for securing said chest belt top half to said chest belt bottom half.

4. The safety harness of claim 1, comprising:
    a waist belt attached to at least one of said back panel bottom strap and said first and second body straps, said waist belt having first and second free ends selectively secured to each other.

5. The safety harness of claim 4, comprising:
    a waist buckle for securing said first waist belt end to said second waist belt end.

6. The safety harness of claim 1, wherein said body straps and said back panel are formed from foamed thermoplastic material resistant to microorganism growth.

7. The safety harness of claim 1, comprising:
    a fabric cover substantially encasing said body straps and said back panel, said cover being easily disinfected.

8. A safety harness for a child, for attachment to a vehicular seatbelt, comprising:
    a pair of body straps having first and second ends, said body straps being adapted to be placed against a child so that said first ends are located over the child's shoulders and said second ends are located between the child's legs;
    a chest belt having a top half attached to at least one of said first ends and a bottom half attached to at least one of said second ends, said top half and bottom half provided with respective cooperating buckle halves for selective engagement one with the other;
    a back panel attached to said pair of body straps, said back panel having top and bottom straps with opposing ends attached to and forming junctions with said pair of body straps, said top and bottom straps being spaced from and substantially in parallel alignment with each other, wherein each of said top and bottom straps are substantially normal to said pair of body straps, said back panel also having a pair of diagonal straps attached to a junction of one of said top and bottom straps and a junction of the other of said top and bottom straps so that said diagonal straps intersect each other approximately medially;
    a waist belt attached to at least one of said back panel bottom strap and said first and second body straps, said waist belt having first and second free ends being provided with respective first and second waist belt halves cooperating with each other to secure around the child's waist; and
    at least one seatbelt strap attached to said body straps between said bottom strap and said body strap second ends, said seatbelt strap and said body strap defining an aperture for receiving a seatbelt.

* * * * *